US007405830B2

(12) United States Patent
Kim et al.

(10) Patent No.: US 7,405,830 B2
(45) Date of Patent: Jul. 29, 2008

(54) VIBRATION-INSENSITIVE INTERFEROMETER

(75) Inventors: Seung Woo Kim, Daejeon (KR); Hagyong Kihm, Daejeon (KR); Jung Jae Park, Seoul (KR)

(73) Assignee: Korea Advanced Institute of Science and Technology (KAIST), Daejeon (KR)

( * ) Notice: Subject to any disclaimer, the term of this patent is extended or adjusted under 35 U.S.C. 154(b) by 211 days.

(21) Appl. No.: 11/207,327

(22) Filed: Aug. 19, 2005

(65) Prior Publication Data

US 2006/0039007 A1 Feb. 23, 2006

(30) Foreign Application Priority Data

Aug. 20, 2004 (KR) ............... 10-2004-0065700
Jul. 13, 2005 (KR) ............... 10-2005-0063110

(51) Int. Cl.
*G01B 9/02* (2006.01)
*G01B 11/02* (2006.01)

(52) U.S. Cl. ........................ 356/495; 356/513
(58) Field of Classification Search ............... 356/494, 356/477, 491, 492, 495–497, 511–514, 520, 356/521; 359/464, 465, 497, 583
See application file for complete search history.

(56) References Cited

U.S. PATENT DOCUMENTS 6,704,112 B1 * 3/2004 Sommargren et al. ....... 356/512

6,879,402 B2 * 4/2005 Kuchel ....................... 356/513

OTHER PUBLICATIONS

Osuk Y. Kwon, et al., "Stroboscopic Phase-Shifting Interferometry", *Optical Letters*, vol. 12, No. 11, Nov. 1987, pp. 855-857.
R. Smythe, et al., "Instantaneous Phase Measuring Interferometry", *Optical Engineering*, vol. 23, No. 4, Jul./Aug. 1984, pp. 361-364.
Toshihiko Yoshino, et al., "Closed-Loop Phase-Shifting Interferometry with a Laser Diode", *Optical Letters*, vol. 23, No. 20, Oct. 15, 1998, pp. 1576-1578.

* cited by examiner

*Primary Examiner*—Patrick Connolly
*Assistant Examiner*—Scott M Richey
(74) *Attorney, Agent, or Firm*—Mayer & Williams PC; Stuart H. Mayer, Esq.; Kerin L. Williams, Esq.

(57) ABSTRACT

The present invention relates to vibration-insensitive point-diffraction interferometry. For the purpose of obtaining high immunity to vibration, a single-mode optical fiber is used to generate the reference wave, by means of point diffraction, directly from a measurement wave reflected from test objects. The capability of vibration desensitization is further strengthened by adding a spatial phase-shift device that enables four interferograms of different amounts of phase shift to be obtained simultaneously with no time delay between interferograms. The present invention may be effectively used in the design of measuring systems for in-line applications where measurements need to be performed in the presence of significant levels of vibration.

7 Claims, 12 Drawing Sheets

VIBRATION-INSENSITIVE INTERFEROMETER

BACKGROUND OF THE INVENTION

1. Field of the Invention

The present invention relates to interferometry. More precisely, the present invention relates to methods and apparatus for a vibration-insensitive point-diffraction interferometer. The methods and apparatus of the present invention may be implemented in measuring systems that measure various parameters of test objects by effectively removing the effect of vibration.

2. Description of the Related Art

Interferometry is a well-established method of measuring various parameters of test objects. Interferometry requires generating two waves; one is generally named the reference wave and the other the measurement wave. The reference wave is generally formed by either a plane wave using the beam of light reflected from a flat surface or a spherical wave using the beam of light generated by means of point diffraction using a pinhole or optical fiber. The measurement wave is generated by either transmitting light through test objects or having light reflected from test objects.

A practical problem encountered in performing interferometry is the presence of vibration, which causes unwanted fluctuation in interference fringes obtained between the reference and measurement waves. The vibration effect is generally considered the main cause of deteriorating measurement accuracy. In order to cope with the vibration problem, several vibration-desensitization methods have been proposed as results of previous work. A method is adopting an active means of monitoring the fluctuation of interference fringes due to vibration using a sensor with subsequent fast moving the reference surface, thus stabilizing the interference fringe (see T. Yoshino et al., Opt. Lett., 23, p. 1576). Another method is using a spatial phase-shift method to capture interference fringes in a very short period time, minimizing vibration fluctuation (see R. A. Smythe et al., Opt. Eng., 23, p. 361). Another method is using a diffraction grating in combination with a pinhole to obtain three spatially phase-shifted interference fringes at the same time (see Osuk Y. Kwon et al., Opt. Lett., 12, p. 855). Another method is using a wave-splitting element that splits the interference wavefront into a plurality of sub-waves with different phase shifts (see U.S. Pat. No. 6,304,330).

SUMMARY OF THE INVENTION

The present invention is to provide a new more effective way of vibration desensitization in interferometer design. The present invention involves two key features; one is generating the reference wave by means of point diffraction using a single-mode optical fiber, and the other is simultaneous capturing of a plurality of phase-shifted interferograms using a spatial phase-shift device.

The first key feature of the present invention is summarized as follows: The reference wave is generated by transmitting the measurement wave, which is reflected from the test object under the influence of vibration, through a single-mode optical fiber. The single mode fiber provides a function of spatial filtering that permits only the lowest spatial mode of the measurement wave front to be transmitted to become the reference wave. The presence of vibration usually affects only the lowest spatial mode of the measurement wave front, so it also appears in the resulting reference wave. The single-mode fiber also provides a means of point diffraction at its exit end, so the wave front emitted from the fiber becomes a near-perfect spherical wave (see H. Kihm et al, Opt. Lett. 29, p. 2366). The reference wave emitted from the fiber is therefore of near perfect spherical wave front and has the same vibration effect as the measurement wave. The vibration effect is consequently cancelled out in the process of interference between the reference and measurement waves.

The second key feature of the present invention is a spatial phase-shift device that allows obtaining a plurality of phase-shifted interferograms simultaneously without time delay between the obtained interferograms. The spatial phase-shift device is a special embodiment of the spatial phase-shift method previously proposed by R. A. Smythe (see R. A. Smythe et al., Opt. Eng., 23, p. 361). This spatial phase-shift device strengthens vibration immunity, in combination with the first key feature of using a single-mode optical fiber, that allows freezing any vibration fluctuation remaining in the interferograms generated by the interference between the reference and measurement waves.

The above-described two features of the present invention are capable of providing a high level of vibration desensitization in various interferometric measurements of physical parameters from measurement objects. The two features may be used separately or in combination, depending on the level of vibration encountered.

In accordance with the present invention, the point-diffraction interferometer further includes an optical path delay line that can be used for selection of a suitable pair of the reference and measurement waves from a plurality of reflected waves from a measurement object. The delay line allows measuring various physical parameters of transparent test objects, such as thickness profile or refractive index, whose information resides within the objects or on the top and/or bottom surfaces.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will now be described in detail in connection with preferred embodiments with reference to FIGS. 1 to 5.

Figure 1:
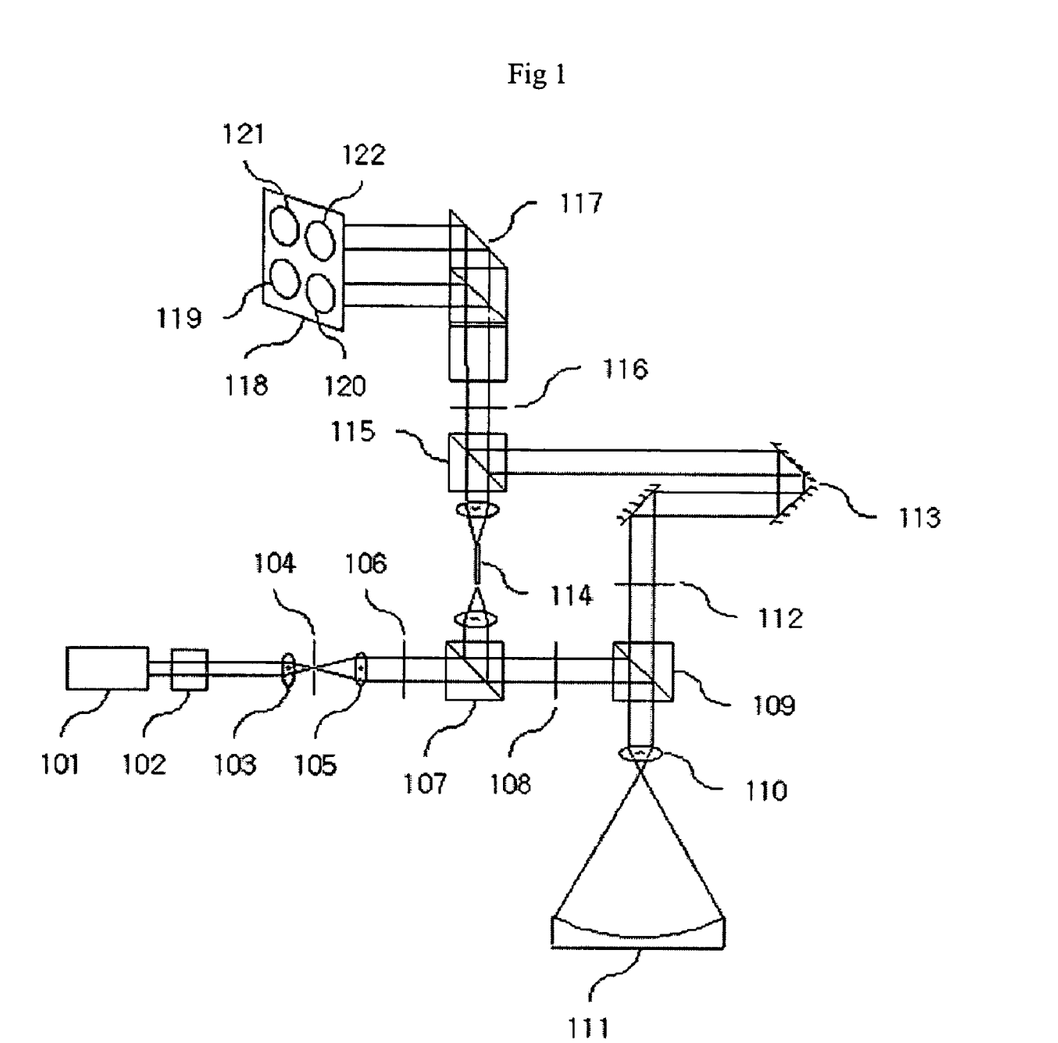
FIG. 1 is a view showing a vibration-insensitive interferometer according to an embodiment of the present invention.

FIG. 1 is a view showing a vibration-insensitive point-diffraction interferometer according to an embodiment of the present invention. FIGS. 10a to 10f are views showing the polarization states of light on the optical paths of the interferometer of FIG. 1.

Figure 3:
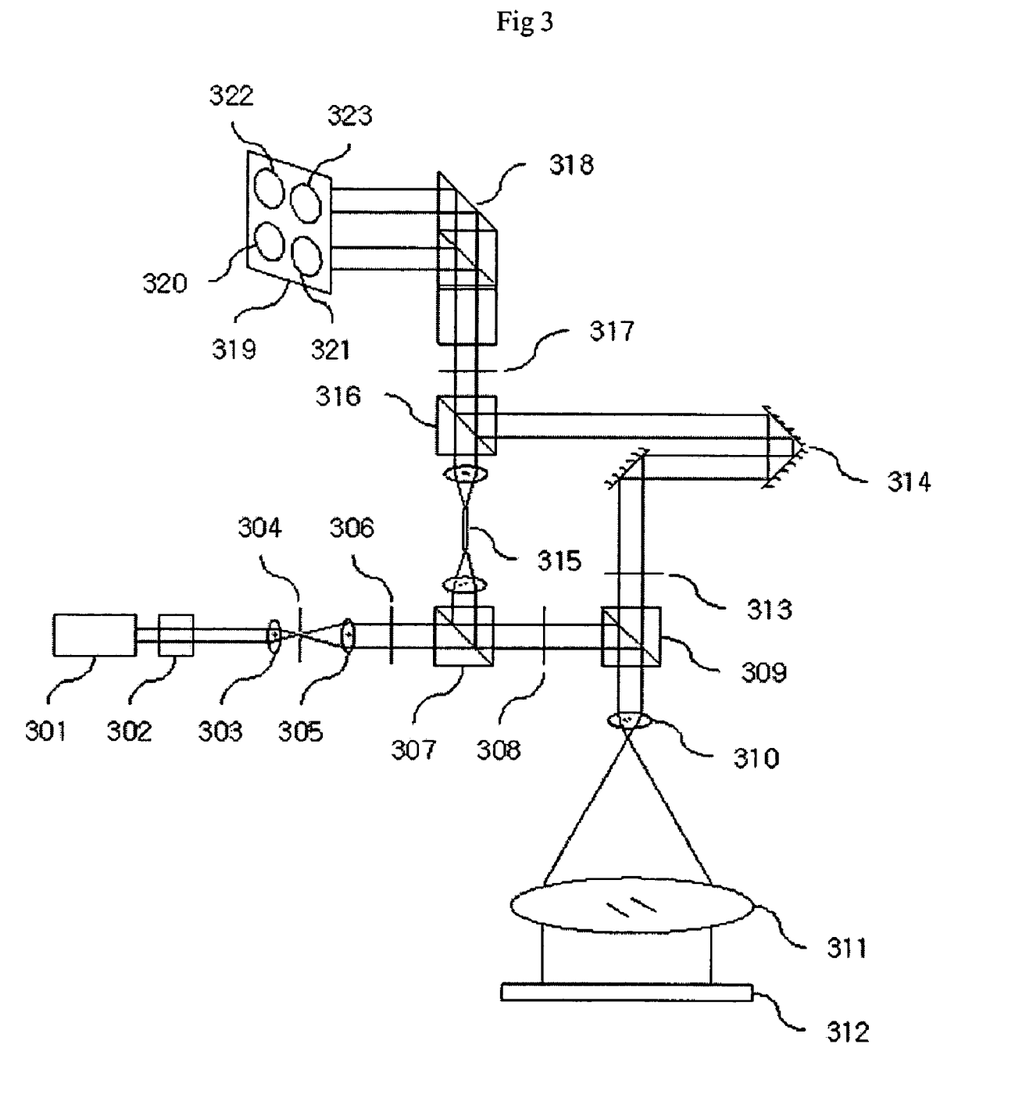
FIG. 3 is a view showing a vibration-insensitive interferometer according to another embodiment of the present invention.

Referring to FIG. 1, a beam of linearly polarized light is emitted from a light source 101 and passed through an optical isolator 102 (or 302 in FIG. 3), and converged onto a spatial filter 104 (or 304 in FIG. 3), by a lens 103 (or 303 in FIG. 3). The optical isolator 102 serves to prevent any light returning from the interferometer optics from going back to the light source 101. The light gone through the spatial filter 104 is collimated by a lens 105 (or 305 in FIG. 3). The state of light having progressed so far is represented as light 501, which has a polarization state shown in FIG. 10a. The collimated light is then passed through a half-wave plate 106 (or 306 in FIG. 3), which is represented as light 502 having the polarization state of FIG. 10b. The half-wave-plate 106 serves to rotate the polarization direction of light of light 501. Light 502 is then passed through a polarizing beam splitter (PBS) 107 (or 307 in FIG. 3). The light passed through the PBS 107 is passed through a quarter-wave plate 108 (or 308 in FIG. 3), and then is reflected toward the test object 111 by an intensity beam splitter (BS) 109 (or 302 in FIG. 3) through a lens 110 (or 310 in FIG. 3). One part of the light reflected from the test object 111 is transmitted by the BS 109 and then made to propagate to generate the measurement wave. At the same time, another part of the light reflected from the measurement object 111 is reflected by the BS 109 and is made to propagate back to the PBS 107 to generate the reference wave.

Figure 10:
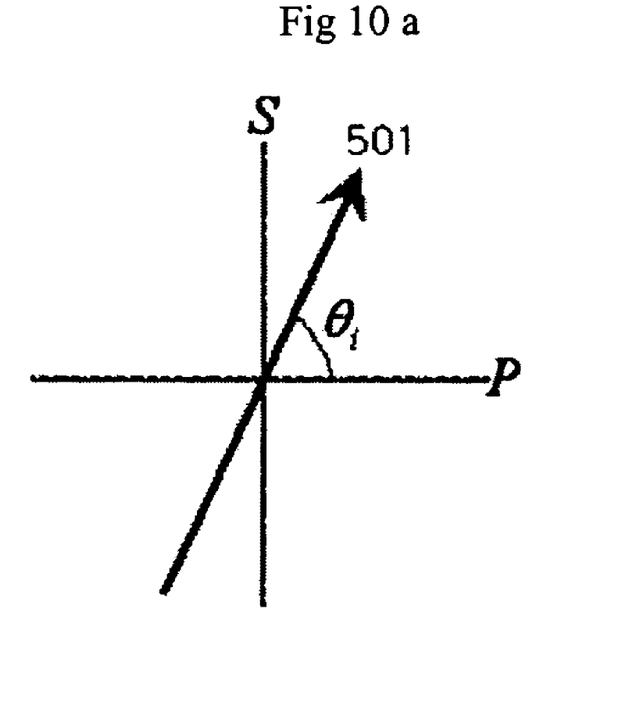
FIGS. 10a to 10f are views showing the polarization states of light on the optical paths of the interferometer of FIG. 1.

The beam of light reflected from the BS 109 (hereinafter referred to as "the reference wave") is again passed through the quarter-wave plate 108. It is then reflected by the PBS 107, and made incident on an optical fiber 114 (or 314 in FIG. 3). The beam of light passed through the optical fiber 114 becomes a near-perfect spherical wave by means of point diffraction at the exit end of the optical fiber 114. The light passed through the optical fiber 114 becomes outgoing light 503, i.e., P-polarized light as shown in FIG. 10b. Since the loss of light caused by the optical fiber 114 is high, the BS 109 is given a high reflectance in comparison with its transmittance.

The total amount of light going into both the reference and measurement waves is adjusted by rotating the transmission polarization direction of the half-wave plate 106. The intensity ratio between the reference wave and the measurement wave is determined by the reflectance of the BS 109. The reflectance of BS 109 is generally given about 90% considering the light loss occurring when focusing light into the single-mode optical fiber 114. This allows obtaining a good fringe visibility in the interference between the reference wave and the measurement wave.

Meanwhile, the light transmitted through the BS 109 (hereinafter referred to as "the measurement wave") becomes outgoing light 504, i.e., S-polarized light, while going through the quarter-wave plate 112 (or 313 in FIG. 3), as shown in FIG. 10c. The optical path of the measurement wave is controlled by a corner cube 113 and is then incident on a polarizing beam splitter (PBS) 115 (or 315 in FIG. 3).

At the PBS 115, the reference wave, which has been passed through the optical fiber 114, and the measurement wave, which has been reflected from the measurement object 111 and then passed through the corner cube 113, meet each other. As shown in FIG. 10d, at both the entrances to the PBS 115, the reference wave 505 and the measurement wave 506 have polarization states that are perpendicular to each other. The reference wave 506 and the measurement wave 505 are therefore combined through the PBS 115 and then emitted. This is shown in FIG. 10e, where the reference wave is represented by light 507, while the measurement wave by light 508.

The polarization state of the reference wave transmitted through the PBS 115 is rotated by 45 degrees by a half-wave plate 116 (or 317 in FIG. 3). The polarization state of the measurement wave reflected by the PBS 115 is also rotated by 45 degrees at the same half-wave plate 116. This is shown in FIG. 10f. Accordingly, the two beams of light are incident on a spatial phase-shift device 117. The interference pattern between the two beams of light appears as four interference patterns whose phases are shifted by 0, 90, 180, 270 degrees, respectively, through the spatial phase-shift device 117. That is, the four generated interference signals 119 (or 320 in FIG. 3), 120 (or 321 in FIG. 3), 121 (or 322 in FIG. 3) and 122 (or 322 in FIG. 3) are detected on the surface of a photodetector 118 (or 319 in FIG. 3) at the same time.

Figure 2:
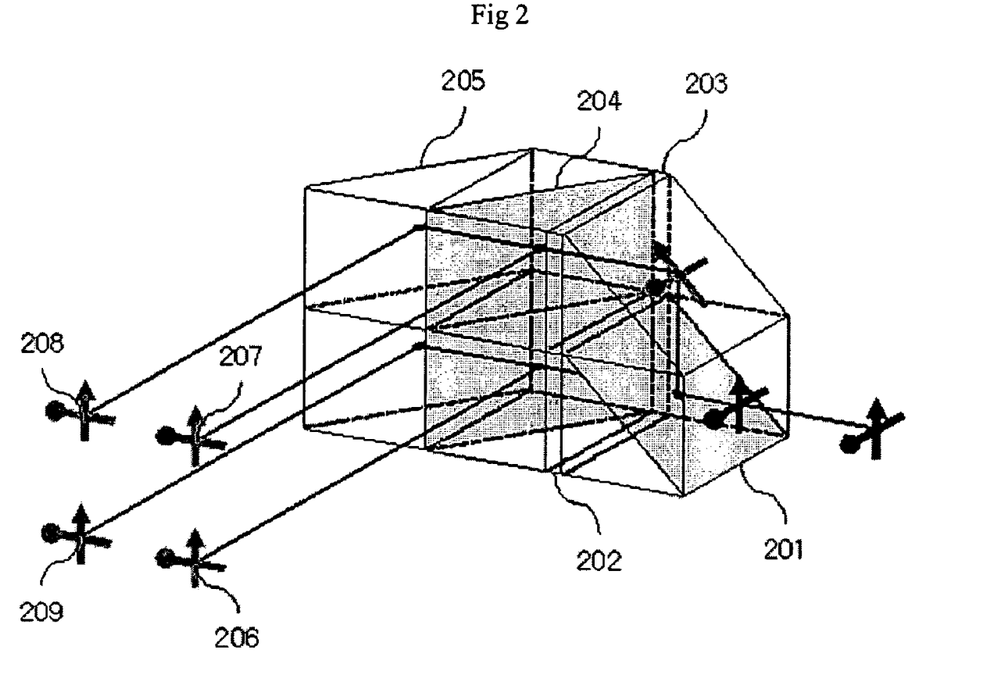
FIG. 2 is a view illustrating the construction and phase shift principle of a spatial phase-shift device used in the interferometer of FIG. 1.

FIG. 2 is a view illustrating the construction and phase shift principle of the spatial phase-shift device used in the interferometer of FIG. 1.

Referring to FIG. 2, the spatial phase-shift device includes a beam splitter 201, a quarter-wave plate 203, a flat plate 202 for adjusting thickness, a polarizing beam splitter 204 and a prism mirror 205. Incoming light, which is an 45-degree rotated combination of the reference and measurement waves, is divided into four separate beams with each beam differently phase-shifted between the reference wave and the measurement wave through the spatial phase-shift device, so that four interference patterns with different amounts of phase shift can be obtained.

That is, the incoming light is reflected by the beam splitter 201 or is transmitted therethrough. The light reflected from the beam splitter 201 is phase-shifted by 90 degrees by the quarter-wave plate 203 and is then incident on the polarizing beam splitter 204. The light incident on the polarization splitter 204 is reflected or is transmitted therethrough. The reflected light is emitted as outgoing light 207. The transmitted light is reflected by the mirror 205 and is then emitted as outgoing light 208. At this time, the outgoing light 207 reflected by the polarizing beam splitter 204 is phase-shifted additionally by 180 degrees. Accordingly, light 207 has a phase shift of 270 degrees and light 208 has a 90 degrees phase shift.

Meanwhile, the light transmitted through the beam splitter 201 goes through the flat plate 202 without phase shift, and is then incident on the polarizing beam splitter 204. The light incident on the polarizing beam splitter 204 is reflected or is transmitted therethrough. The reflected light is emitted as outgoing light 206. The transmitted light is reflected by the mirror 205 and then is emitted as outgoing light 209. The outgoing light 209 transmitted through the polarizing beam splitter 204 has no phase shift, while the reflected light 206 is phase-shifted by 180 degrees. Accordingly, the four beams of outgoing lights, 206, 207, 208 and 209 are phase-shifted by 0, 90, 180, and 270 degrees, respectively, so that fringe analysis of four interference patterns can be made using one photodetector.

Figure 9:
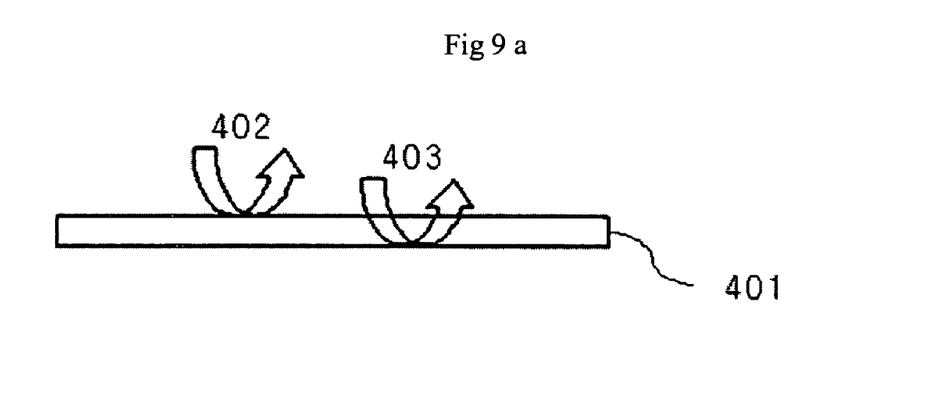
FIG. 9a is a view showing the states of light reflected from the front and back of the glass flat plate of FIG. 3.
FIG. 9b is a view showing the principle in which the measurement wave and reference wave are interfered with through the scanning of a corner cube.

FIG. 3 is a schematic showing a vibration-insensitive interferometer according to another embodiment of the present invention. The overall construction of the interferometer system of FIG. 3 is almost the same as that of FIG. 1 except the insertion of a collimating lens 311. The interferometer of FIG. 3 is configured with an intention of measuring the thickness profile or refractive index of a transparent test object 312 such as a glass plate. In this case, the reference wave is generated from the wave reflected from the top surface of the test object, which is denoted as light 402 in FIG. 9a. On the other hand, the measurement wave is selected the wave reflected from the bottom surface of the test object, which is shown as light 403 in FIG. 9b. (Note that the opposite selection of waves, i.e., light 402 for the measurement wave and light 403 for the reference wave, is also possible.) This separate selection is made by adjusting the optical path delay line 314. At the same time, the light source 301 is a low-coherence source such as a white light, a diode laser, or a short pulse laser. In this case, the optical path of the reference wave becomes different from that of the measurement wave, but the optical path offset is adjusted by moving the corner cube 314 so that the two waves from different surfaces interfere with each other as illustrated in FIG. 9b. In FIG. 9b, pulses 404 and 406 are reflected from the bottom surface of the transparent object 401, while pulses 405 and 407 are from the top surface.

Figure 4:
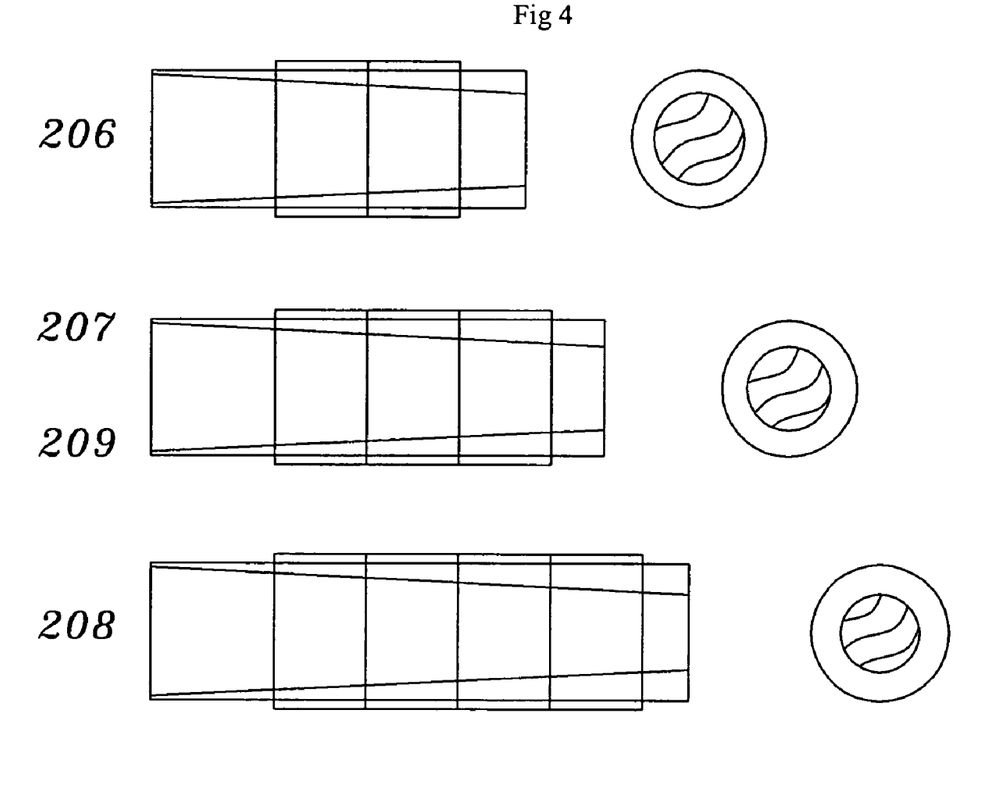
FIG. 4 is a schematic view illustrating interference patterns and optical paths that are obtained by the spatial phase-shift device of FIG. 2.

The individual optical paths for four interference patterns at the exit of the spatial phase-shift device, 117 in FIG. 1 (or 318 in FIG. 3), are described below with reference to FIG. 4:

As shown in FIG. 4, outgoing lights 206, 207, 208, and 209 experience different optical paths within the spatial phase-shift device 117.

Figure 5:
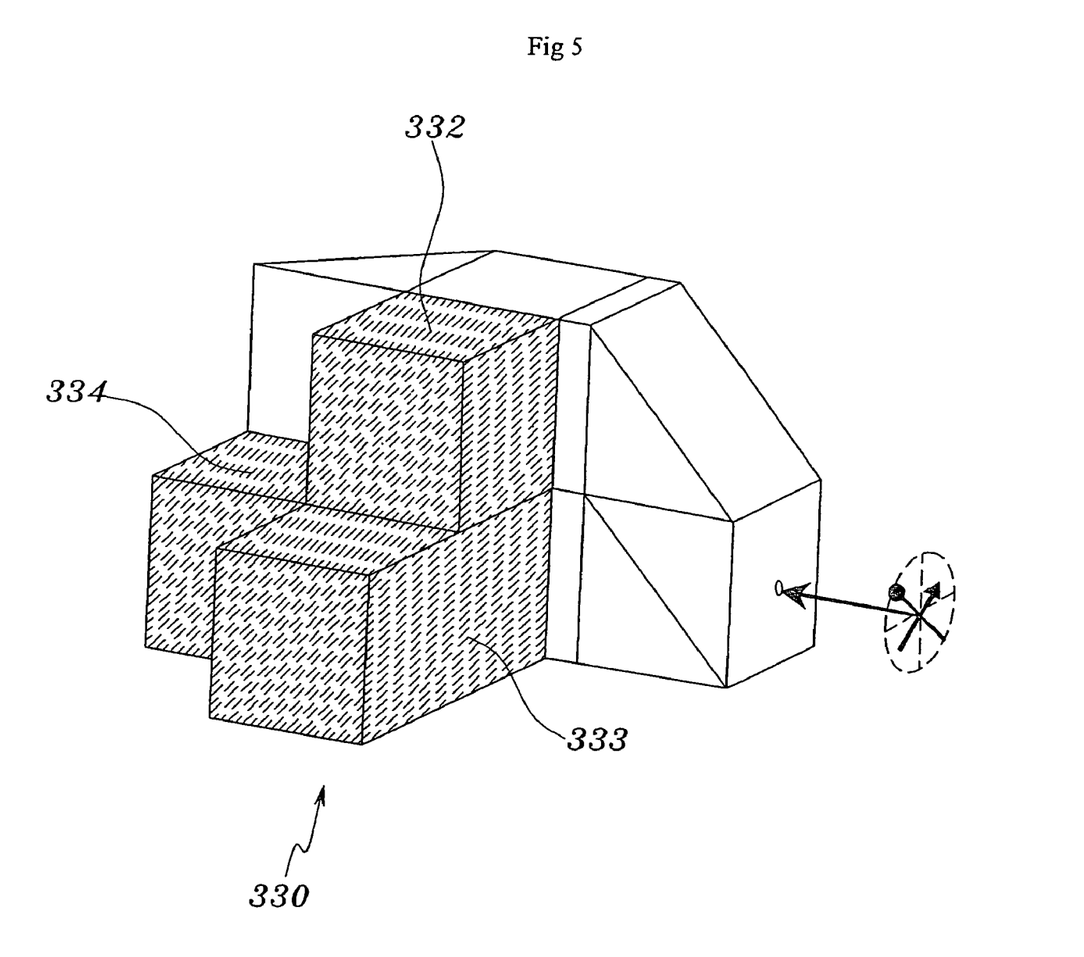
FIG. 5 is a view illustrating the optical path compensation block of the spatial phase-shift device according to an embodiment of the present invention.

FIG. 5 is a view illustrating the optical path compensation blocks of the spatial phase-shift device 117 according to an embodiment of the present invention. Referring to FIG. 5, the optical path compensation block assembly 330 of the present embodiment is constructed by adding glass blocks 332, 333 and 334, so that the optical path differences in lights 206, 207, 208, and 209, are made to be identical.

Figure 6:
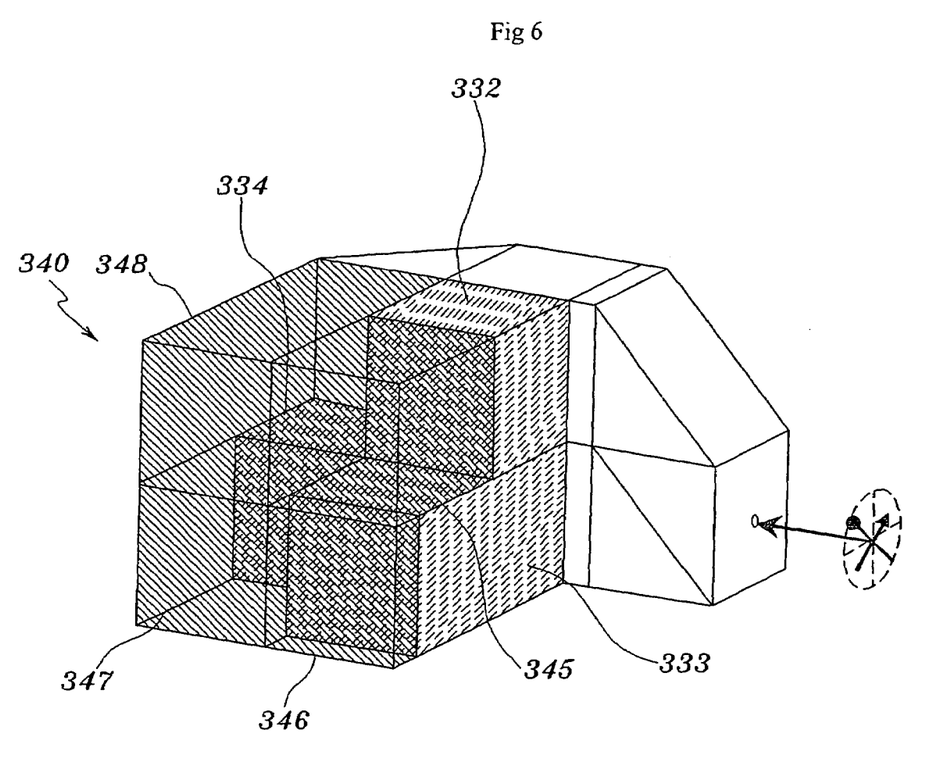
FIG. 6 is a view showing a state where an anti-distortion block or the phase-shift device of FIG. 5 is constructed.
Figure 7:
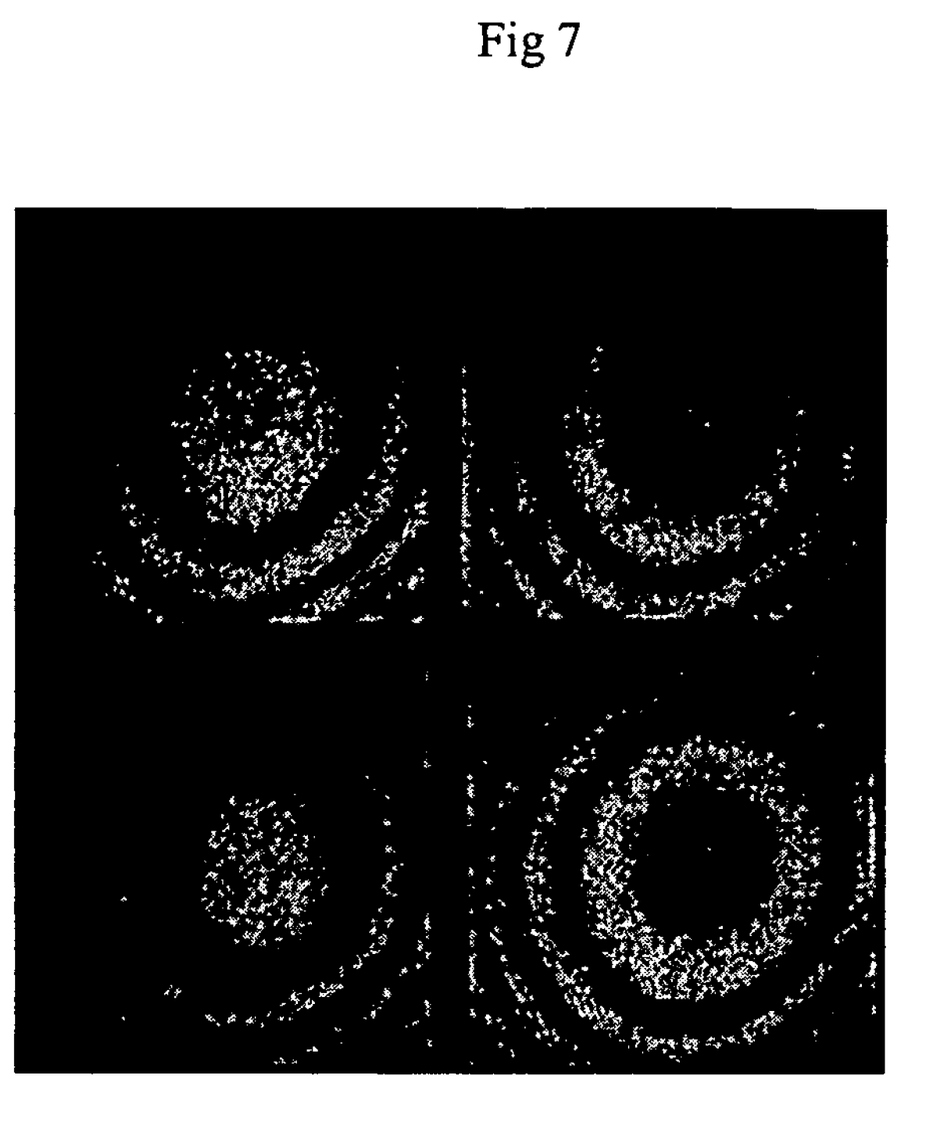
FIG. 7 is a view showing four interference patterns that are obtained by the spatial phase-shift device according to the present invention.
Figure 8:
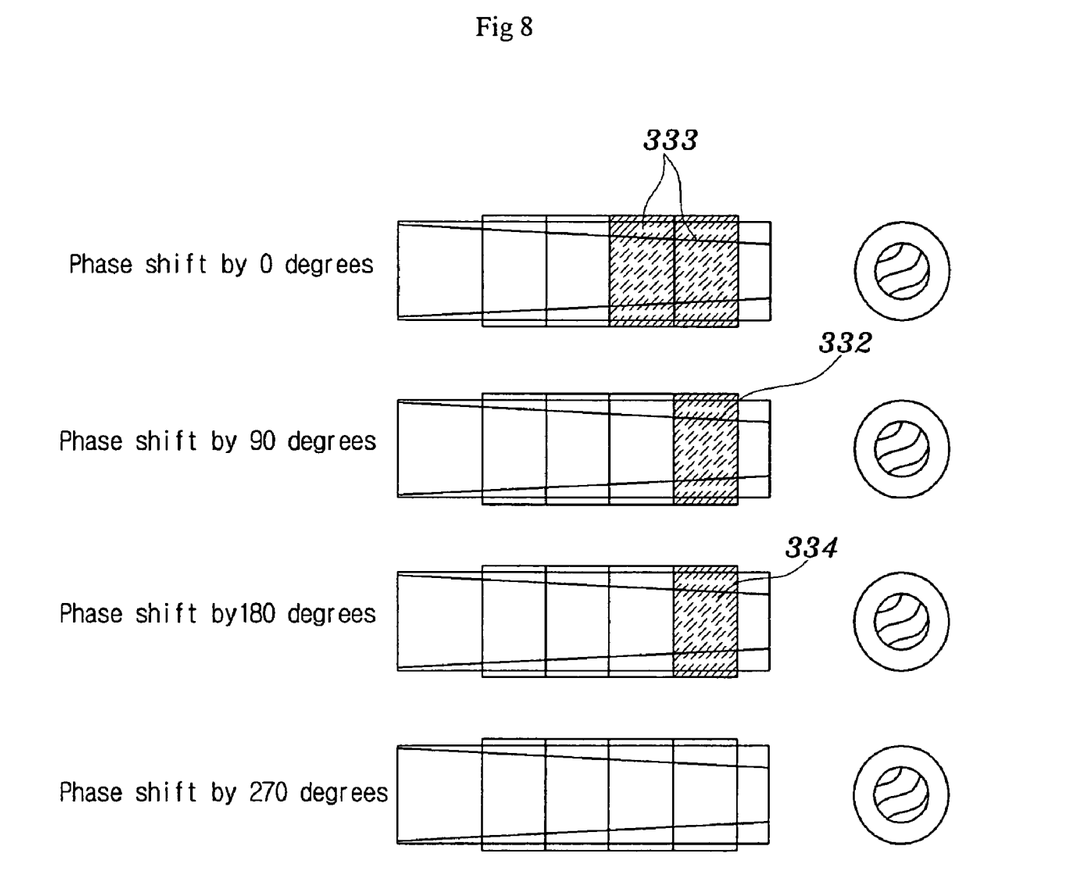
FIG. 8 is a schematic diagram illustrating interference patterns and optical paths that are obtained by the spatial phase-shift device of the present invention.

FIG. 6 is a view showing an anti-distortion block assembly 340 for the phase-shift device 117, which comprises a set of optical blocks 346 made of fiber bundles, 345, 347, and 348. Using the optical path compensation block assembly 330 of FIG. 5 along with the anti-distortion block assembly 340 of FIG. 6, the detector 118 in FIG. 1 is capable of capturing four interference patterns of lights 206, 207, 208, and 209, in an identical image size with an identical level of image distortion. This situation is explained geometrically in FIG. 8 with an exemplary set of interference patterns shown in FIG. 7. This embodiment allows accurate matching of image pixels among four interference patterns, which leads to accurate implement of fringe analysis.

As described above, the present invention is capable of stabilizing interference patterns through a common path-type interferometer using a single mode optical fiber. Furthermore, using the spatial phase-shift device of the present invention, the influence of vibration can be reduced through real-time analyses of interference patterns. Furthermore, more accurate measurement results can be obtained based on the generation of a perfect reference wave front through a single mode optical fiber, so that the usability of the interferometer is very high in the presence of high level of vibration.

Although the preferred embodiments of the present invention have been disclosed for illustrative purposes, those skilled in the art will appreciate that various modifications, additions and substitutions are possible without departing from the scope and spirit of the invention as disclosed in the accompanying claims.

What is claimed is:

1. A point-diffraction interferometer for vibration desensitization, said interferometer comprising:
   a collimated light source with linear polarization for illuminating test objects;
   a single-mode optical fiber for generating a near perfect spherical reference wave front from a measurement wave;
   a polarizing beam splitter in combination with a half-wave plate, a quarter-wave plate, and an intensity beam splitter, for forming the reference wave directly from part of a measurement wave reflected from test objects; and
   an optical path delay line comprising a corner cube for matching the optical path length of the measurement wave to that of the reference wave.

2. The point-diffraction interferometer as set forth in claim 1, wherein said optical path delay line is used for selection of a suitable pair of the reference and measurement waves from a plurality of reflected waves from partially transparent objects thicker than the temporal coherence length of the light source.

3. The point-diffraction interferometer as set forth in claim 1, wherein said light source comprises a low-coherence source.

4. The point-diffraction interferometer as set forth in claim 1, wherein the reference and measurement waves are separately selected among the reflected waves either from the top or the bottom surface of transparent test objects.

5. The point-diffraction interferometer as set forth in claim 3, wherein said low-coherence source comprises a white light, a diode laser, or a short pulse laser.

6. A point-diffraction interferometer for vibration desensitization, said interferometer comprising:
   a collimated light source with linear polarization for illuminating test objects;
   a means of point diffraction for generating a near perfect spherical reference wave front from a measurement wave;
   a polarizing beam splitter in combination with a half-wave plate, a quarter-wave plate, and an intensity beam splitter, for forming the reference wave directly from part of a measurement wave reflected from test objects; and
   an optical path delay line comprising a corner cube for matching an optical path length of the measurement wave to that of the reference wave.

7. The point-diffraction interferometer as set forth in claim 6, wherein said means of point diffraction comprises a multimode or photonic-crystal fiber, a pinhole, or a wave guide.

* * * * *